(12) United States Patent
Bryll et al.

(10) Patent No.: US 7,454,053 B2
(45) Date of Patent: Nov. 18, 2008

(54) SYSTEM AND METHOD FOR AUTOMATICALLY RECOVERING VIDEO TOOLS IN A VISION SYSTEM

(75) Inventors: Robert K. Bryll, Bothell, WA (US); Kozo Ariga, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 949 days.

(21) Appl. No.: 10/978,227

(22) Filed: Oct. 29, 2004

(65) Prior Publication Data

US 2006/0093205 A1      May 4, 2006

(51) Int. Cl.
G06K 9/00 (2006.01)
(52) U.S. Cl. ...................................... 382/152
(58) Field of Classification Search ......... 382/141–152; 348/92, 95, 125; 702/34
See application file for complete search history.

(56) References Cited

U.S. PATENT DOCUMENTS

| | | | |
|---|---|---|---|
| 4,965,443 A | 10/1990 | Yamasaki et al. |
| 4,969,037 A | 11/1990 | Poleschinski et al. |
| 5,136,660 A | 8/1992 | Flickner et al. |
| 5,227,830 A | 7/1993 | Yoshihara et al. |
| 6,542,180 B1 | 4/2003 | Wasserman et al. |
| 6,627,863 B2 | 9/2003 | Wasserman |
| 6,665,425 B1 | 12/2003 | Sampath et al. |
| 6,753,919 B1 | 6/2004 | Daugman |

2003/0095710 A1    5/2003   Tessadro

OTHER PUBLICATIONS

Ballard, D.H., "Generalizing the Hough Transform to Detect Arbitrary Shapes," *Pattern Recognition* 13(2):111-122, 1981.
Kautsky, J., et al., "A New Wavelet-Based Measure of Image Focus," *Pattern Recognition Letters* 23:1785-1794, 2002.
*QVPAK 3D CNC Vision Measuring Machine Operation Guide*, Version 2.0, Manual No. 4911GB, Series No. 359, Mitutoyo Corporation & Micro Encoder Inc., Kanagawa, Japan, Sep. 1996.
*QVPAK 3d CNC Vision Measuring Machine User's Guide*, Version 7, 1st ed., Manual No. 99MCB225A, Series No. 359, Mitutoyo Corporation & Micro Encoder Inc., Kanagawa, Japan, Jan. 2003.
Yazdi, H.R., and T.G. King, "Application of 'Vision in the Loop' for Inspection of Lace Fabric," *Real-Time Imaging* 4(5):317-332, 1998.

*Primary Examiner*—Daniel G Mariam
(74) *Attorney, Agent, or Firm*—Christensen O'Connor Johnson Kindness PLLC

(57) ABSTRACT

Methods and systems for automatically recovering a failed video inspection tool in a precision machine vision inspection system are described. A set of recovery instructions may be associated or merged with a video tool to allow the tool to automatically recover and proceed to provide an inspection result after an initial failure. The recovery instructions include operations that evaluate and modify feature inspection parameters that govern acquiring an image of a workpiece feature and inspecting the feature. The set of instructions may include an initial phase of recovery that adjusts image acquisition parameters. If adjusting image acquisition parameters does not result in proper tool operation, additional feature inspection parameters, such as the tool position, may be adjusted. The order in which the multiple feature inspection parameters and their related characteristics are considered may be predefined so as to most efficiently complete the automatic tool recovery process.

20 Claims, 8 Drawing Sheets

SYSTEM AND METHOD FOR AUTOMATICALLY RECOVERING VIDEO TOOLS IN A VISION SYSTEM

FIELD OF THE INVENTION

The invention relates generally to methods for operating a machine vision inspection system with a camera and stage that are movable relative to one another in multiple directions so as to scan and inspect selected features of a workpiece on the stage, and more particularly to systems and methods that automatically recover or augment the operation of video-based inspection/measuring tools used in such a vision system.

BACKGROUND OF THE INVENTION

Precision machine vision inspection systems (or "vision systems" in short) can be utilized to obtain precise dimensional measurements of inspected objects and to inspect various other object characteristics. Such systems may include a computer, a camera and optical system, and a precision stage that is movable in multiple directions so as to allow the camera to scan the features of a workpiece that is being inspected. One exemplary prior art system that is commercially available is the QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the QVPAK 3D CNC Vision Measuring Machine User's Guide, published January 2003, and the QVPAK 3D CNC Vision Measuring Machine Operation Guide, published September 1996, each of which is hereby incorporated by reference in their entirety. This product, as exemplified by the QV-302 Pro model, for example, is able to use a microscope-type optical system to provide images of a workpiece at various magnifications, and move the stage as necessary to traverse the workpiece surface beyond the limits of any single video image. A single video image typically encompasses only a portion of the workpiece being observed or inspected, given the desired magnification, measurement resolution, and physical size limitations of such systems.

Machine vision inspection systems generally utilize automated video inspection. U.S. Pat. No. 6,542,180 teaches various aspects of such automated video inspection and is incorporated herein by reference in its entirety. As taught in the '180 patent, automated video inspection metrology instruments generally have a programming capability that allows an automatic inspection event sequence to be defined by the user for each particular workpiece configuration. This can be implemented by text-based programming, for example, or through a recording mode which progressively "learns" the inspection event sequence by storing a sequence of machine control instructions corresponding to a sequence of inspection operations performed by a user, or through a combination of both methods. Such a recording mode is often referred to as "learn mode" or "training mode." Once the inspection event sequence is defined in "learn mode," such a sequence can then be used to automatically acquire (and additionally analyze or inspect) images of a workpiece during "run mode."

The machine control instructions including the specific inspection event sequence (i.e., how to acquire each image and how to analyze/inspect each acquired image) are generally stored as a "part program" or "workpiece program" that is specific to the particular workpiece configuration. For example, a part program defines how to acquire each image, such as how to position the camera relative to the workpiece, at what lighting level, at what magnification level, etc. Further, the part program defines how to analyze/inspect an acquired image, for example, by using one or more video tools such as edge/boundary detection video tools.

Proper operation of a video tool depends on correct settings of various machine, image, and video tool parameters that affect the operation of the tool. For example, for an edge/boundary detection video tool to locate a target edge/boundary in an image, the image should be acquired with a correct level of lighting/brightness, focusing, magnification, etc. Also, the region of interest of a video tool (i.e., the region within a video image that the video tool searches) must be set so as to actually contain an edge/boundary feature to be detected.

Generally, the relevant machine and video tool parameters that govern acquiring an image of a workpiece feature and inspecting the feature are established and set under rather ideal conditions at the outset of defining and training a video tool, for example during a training mode of operation and programming. This is because, generally, an operator observes a real-time display of the workpiece feature and adjusts the relevant machine and video tool parameters, such as machine positioning, lighting, tool positioning and orientation, and other parameters until they are observed to be in a relatively ideal state for providing an accurate inspection result for the feature. However, during subsequent repeated automatic operation of the video tool in run mode, various unforeseen variations in part fabrication, part fixturing, vision machine degeneration, ambient lighting condition, and the like, may contribute to a set of operating conditions that are not suitable for the proper operation of the video tool according to its previously established operating parameters. Thus, conventional video tools may fail to operate properly during "run mode" operations, for example, due to one or more unexpected variations in operating conditions or workpiece characteristics. Conventional video tools may also fail to operate properly during "learn mode" operations, because a relatively inexperienced user may be unable to set the relevant machine, image, or video tool parameters correctly, due to poor understanding of the operation of the tool and/or inexperience regarding its application.

Currently, when a conventional video tool fails to operate properly, further operation of the tool is aborted and a user is forced to intervene and recover the tool manually, e.g., by manually adjusting the camera position relative to the workpiece, and/or adjusting the lighting, and/or adjusting various parameters of the video tool. This is a cumbersome and time-consuming procedure, which significantly reduces operator productivity during learn mode and/or the inspection throughput of the vision system during run mode. It also requires a fairly high level of skill and experience on the part of the operator, in order to analyze the reason for failure of the video tool and provide adjustments to the video tool parameters that insure robust operation in the future.

Therefore, a need exists for a method and system for automatically recovering and/or augmenting the operation of a failed video tool, so that the need for operator intervention in the case of a failed video tool is reduced or eliminated.

SUMMARY OF THE INVENTION

The present invention offers methods and systems for automatically recovering a failed video tool in a vision system. According to one aspect, the invention offers a program or routine that may be associated or merged with a video tool, or "called" upon the occurrence of a video tool failure, to allow the tool to automatically recover and proceed to provide an inspection result. That is, upon encountering a failure, the recovery program or routine includes operations that modify, reprogram, or otherwise fix relevant machine, image, and video tool parameters that govern acquiring an image of a workpiece feature and inspecting the feature. The relevant machine, image, and video tool parameters that govern important aspects of acquiring an image of a workpiece feature and inspecting the feature are also referred to herein, either collectively or individually, as feature inspection parameters.

In various exemplary embodiments of the invention, a method for automatically recovering the operations of a video tool in a precision machine vision inspection system may include an image characteristic analysis phase of recovery that includes generally three steps. First, upon detecting a video tool failure in relation to a workpiece feature to be inspected, one or more image characteristic values are determined based on the analysis of an image of the feature, at least in a region around the feature. An image characteristic value is any value that is indicative of a relevant characteristic or quality of an image, such as the image brightness, image focus, or the like. Second, for each of the determined image characteristic values, it is determined whether the value falls within an acceptable range, which may generally be a predetermined range, a default range, or a range that depends upon one or more current feature inspection parameters. According to the characteristic values, the image can be determined to be, too dark, too bright, out of focus, etc. Then, third, the appropriate feature inspection parameter(s) of the precision machine vision inspection system are adjusted so as to bring the image characteristic value(s) within the acceptable range. For example, if the average brightness of an image is outside an acceptable range, various hardware/software parameters that affect the lighting conditions for the image are adjusted.

In various exemplary embodiments of the invention, multiple feature inspection parameters are considered, and a method of evaluating and correcting a feature inspection parameter, similar to that described above, is repeated for each of the multiple feature inspection parameters. For example, if an image characteristic analysis phase of recovery such as that outlined above does not result in the proper operation of the video tool, an additional phase of recovery, such as a tool/feature position and orientation analysis phase, may be performed in order to adjust other feature inspection parameters. Furthermore, if such additional phases of recovery do not result in the proper operation of the video tool, then an image enhancement phase of recovery may be included in some embodiments of the present invention.

Regardless of the number of feature inspection parameter adjustment operations performed, the order in which the multiple feature inspection parameters and their related characteristics are considered may be predefined so as to most efficiently complete the automatic tool recovery process. For example, a feature inspection parameter whose proper setting is a prerequisite to evaluating and/or adjusting other feature inspection parameters may be evaluated and adjusted first, while another feature inspection parameter whose evaluation and/or adjustment is best performed after other parameters are properly adjusted may be evaluated and corrected last, e.g., in many cases image focus is best evaluated and corrected after the image brightness is evaluated and adjusted. Furthermore, a feature inspection parameter that is associated with one of the most frequent causes of a tool failure may be evaluated and corrected at a relatively early stage, while another feature inspection parameter that is associated with a less frequent cause of a tool failure may be considered at a relatively early stage. Furthermore, a feature inspection parameter that is correctable by adjusting relatively few, or rapidly analyzed and adjusted, hardware/software characteristics may be evaluated and corrected earlier, while another feature inspection parameter that requires adjusting several, or relatively slowly analyzed and adjusted, hardware/software characteristics may be considered later.

In accordance with one aspect of the invention, in some embodiments a method for automatically recovering a video tool calculates one or more image characteristic values indicative of image brightness and/or focus of an image. Then, if either image characteristic value is determined to be outside a predefined acceptable range, suitable hardware/software parameters of the precision machine vision inspection system, such as various lighting control parameters, are adjusted so as to bring the image characteristic value within the predefined acceptable range.

In accordance with another aspect of the invention, in various embodiments the method may include the step of repositioning and/or reorienting the video tool, or, more precisely, the region of interest of the video tool, relative to the feature inspected. This may be accomplished, for example, by repositioning the region of interest of the video tool in the image, and/or by repositioning the camera relative to the workpiece and acquiring a new image (if necessary).

In accordance with another aspect of the invention, in various embodiments the method may include the step of adjusting various operating parameters of a video tool. For example, for various edge detection tools, an edge polarity indicator, one or more edge detection thresholds, or other edge tool parameters may be adjusted based on various characteristics of a current image. Briefly, an edge detection threshold defines the light intensity gradient that a video tool recognizes as indicative of the presence of an edge/boundary feature. Thus, by lowering the edge detection threshold of a video tool, the method renders the tool more sensitive to even "weak" edges having a small light intensity gradient. In many machine vision inspection systems, specific values are determined for one or more edge detection parameters associated with a specific workpiece feature, by "training" an edge detection tool positioned to inspect the feature, during a learn mode of operations. Such training is routinely performed automatically during learn mode operations and the associated parameter values are stored in association with a part program for inspecting the associated workpiece.

In accordance with another aspect of the present invention, in some embodiments, if the adjustment of various feature inspection parameters does not result in the proper operation of the video tool, one or more image enhancement operations may be performed in order to achieve proper operation of the video tool. For example, various filtering and/or image thresholding operations, or the like, may be performed, at least in a region of the image around the feature to be inspected. The video tool may then be rerun on the resulting image. However, in such cases, it is important to use care that the image enhancement operations do not significantly alter relevant aspects of the feature that is to be inspected, for example by shifting the apparent location of an edge, or the like.

In accordance with another aspect of the present invention, in some embodiments, if a set of recovery operations fail to provide proper operation the video tool, the video tool may be replaced by a more robust video tool that provides a similar inspection result. For example, a conventional edge detection tool that operates based on intensity gradients in the workpiece image may fail due to marginal lighting effectiveness, or textured surfaces surrounding and obscuring an edge, or the like. In such a case, the recovery operations may include replacing the conventional edge detection tool with a boundary detection tool based on color or texture variations, or the like. Such a "replacement" tool may not be preferred initially because it takes longer to execute, or provides lower-accuracy results, for example.

In accordance with a further aspect of the present invention, an automatic tool recovery method is practiced by computer-executable instructions loaded to a control system portion of a precision machine vision inspection system.

In accordance with a further aspect of the present invention, in some embodiments, a robust video tool is provided, which is highly tolerant to lighting, focus, position and orientation and workpiece edge/surface characteristic fluctuations, among others. The video tool is configured to carry out a predefined image analysis/inspection operation on an image of an workpiece to be inspected. Further, the video tool is associated with a set of automatic tool recovery instructions that automatically attempt to recover the tool when it fails. Such instructions may be included in a computer program, for example. In some embodiments the instructions are merged with, and/or indistinguishable from, the operation of a video tool. In other embodiments the instructions comprise a program or routine or the like that is stored separately from, but operable in association with, the operations of a video tool. In various embodiments the automatic tool recovery instructions may operate according to any one or more of the aspects of the invention outlined above.

In accordance with a further aspect of the invention, in various embodiments the operation of the automatic tool recovery instructions is configurable by a user, either globally, or in association with the operation of a particular video tool, or both. For example, the user may configure the instructions so that only one or more selected types of feature inspection parameter adjustments (lighting adjustment, focus adjustment, position and orientation adjustment, etc.) are performed by the automatic recovery instructions. As another example, the user may specify a tolerance level, or allowed adjustment range, for each type of adjustment that is potentially to be performed by the instructions.

In accordance with a further aspect of the invention, in some embodiments the automatic tool recovery instructions are configured to keep track of the types of video tools that have failed and/or the types of adjustments that have been performed to recover each tool, in relation to a particular feature, and/or workpiece, and/or machine vision inspection system. Such data can be compiled and analyzed by the user, for example, to investigate the frequent causes of a tool failure in order to reduce future tool failures. For example, based on the analysis, the user might adjust or repair a machine, and/or optimally define various hardware/software parameters for the proper operation of each tool, and/or optimally configure various related recovery operations, either globally, or in relation to a particular tool.

In accordance with another aspect of the present invention, in some embodiments, a part program is created "offline" based on CAD data, or the like, and the part program includes automatic recovery operations according to this invention. The part program created offline is then initially run to inspect an actual workpiece and the automatic recovery operations attempt to recover at least some video tool failures during the initial run. When a tool recovery is successful, the adjusted feature inspection parameters used for the successful tool operation are used to replace the "failed" parameters initially included in the part program. The replacement may be done manually, based on output reports identifying the adjusted feature inspection parameters used for each successful tool recovery, or semi-automatically, or automatically. If the replacement was done semi-automatically, or automatically, the instructions which cause the automatic replacement may be disabled or deleted after the replacement, so that the resulting new part program is "stable" unless intentionally changed by a user thereafter. The resulting new part program is stored. The new part program is thereafter used in preference to the initial part program for automatic inspection operations.

In accordance with another aspect of the present invention, a part program including automatic recovery operations according to this invention is run to inspect an actual workpiece and the automatic recovery operations attempt to recover at least some video tool failures during the run. The part program includes instructions that enable one or more adjusted feature inspection parameters used for a successful tool recovery to automatically replace the counterpart "failed" parameters previously included in the part program. In one embodiment, the instructions which cause the automatic replacement may be disabled or deleted after the replacement, so that the resulting new part program is "stable" unless intentionally changed by a user thereafter. In another embodiment, the instructions that enable the successful feature inspection parameters to replace the counterpart "failed" parameters continually reside in the part program, and execution of the instructions may be enabled or disabled by the user adding or changing one or more appropriate part program control statements.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
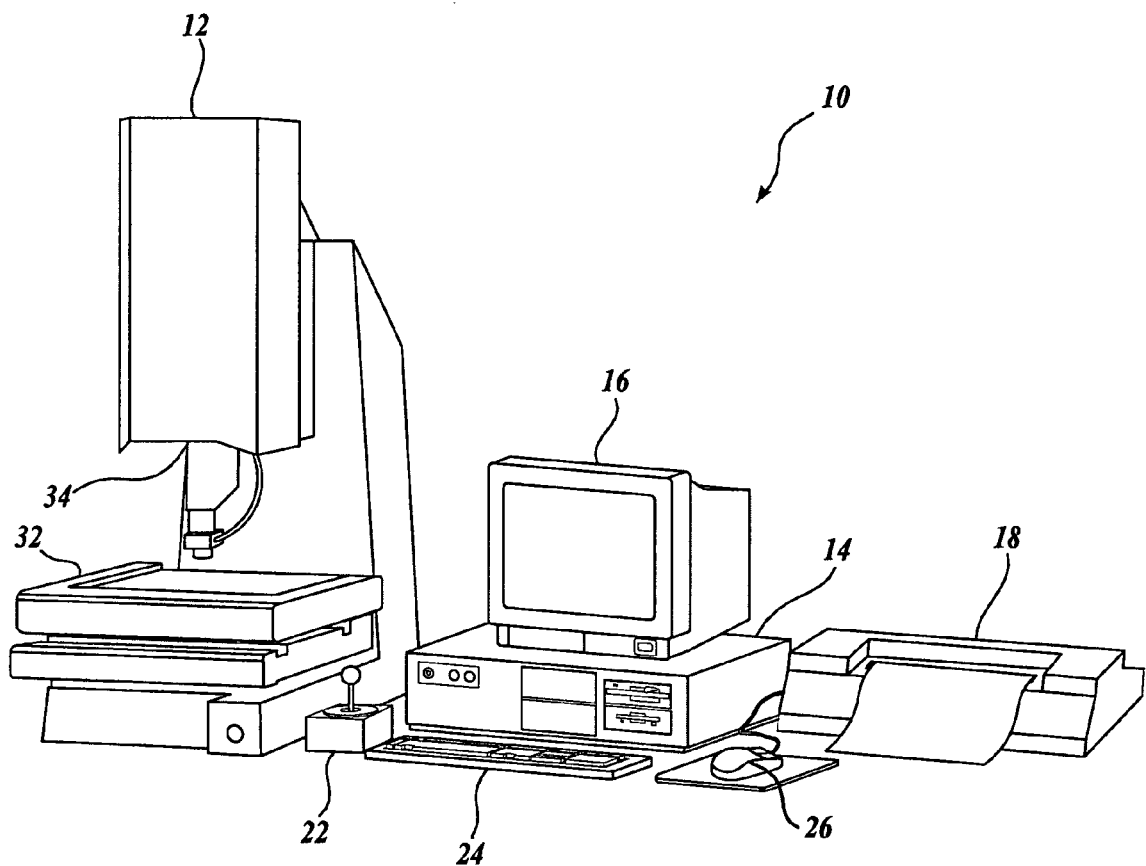
FIG. 1 is a diagram showing various typical components of a machine vision inspection system.

FIG. 1 is a block diagram of one exemplary machine vision inspection system 10 in accordance with the present invention. The machine vision inspection system 10 includes a vision measuring machine 12 that is operably connected to exchange data and control signals with a controlling computer system 14. The controlling computer system 14 is further operably connected to exchange data and control signals with a monitor 16, a printer 18, a joystick 22, a keyboard 24, and a mouse 26. The vision measuring machine 12 includes a moveable workpiece stage 32 and an optical imaging system 34 which may include a zoom lens or interchangeable lenses. The zoom lens or interchangeable lenses generally provide various magnifications for the images provided by the optical imaging system 34.

The joystick 22 can typically be used to control the movement of the movable workpiece stage 32 in both X and Y directions, which are generally parallel to the focal plane of the optical imaging system 34. The joystick 22 can also control the movement of the movable optical imaging system 34 in the Z or focus direction. Frequently, the Z axis movement is controlled by a rotary deflection component of a handle or knob of the joystick 22. The joystick 22 may be provided in a form other than that shown, such as any visual representation or widget on the monitor 16 which is intended to function as a "virtual motion control device" of the machine vision inspection system 10 and is controllable through any computer input device such as the mouse 26 or the like.

Figure 2:
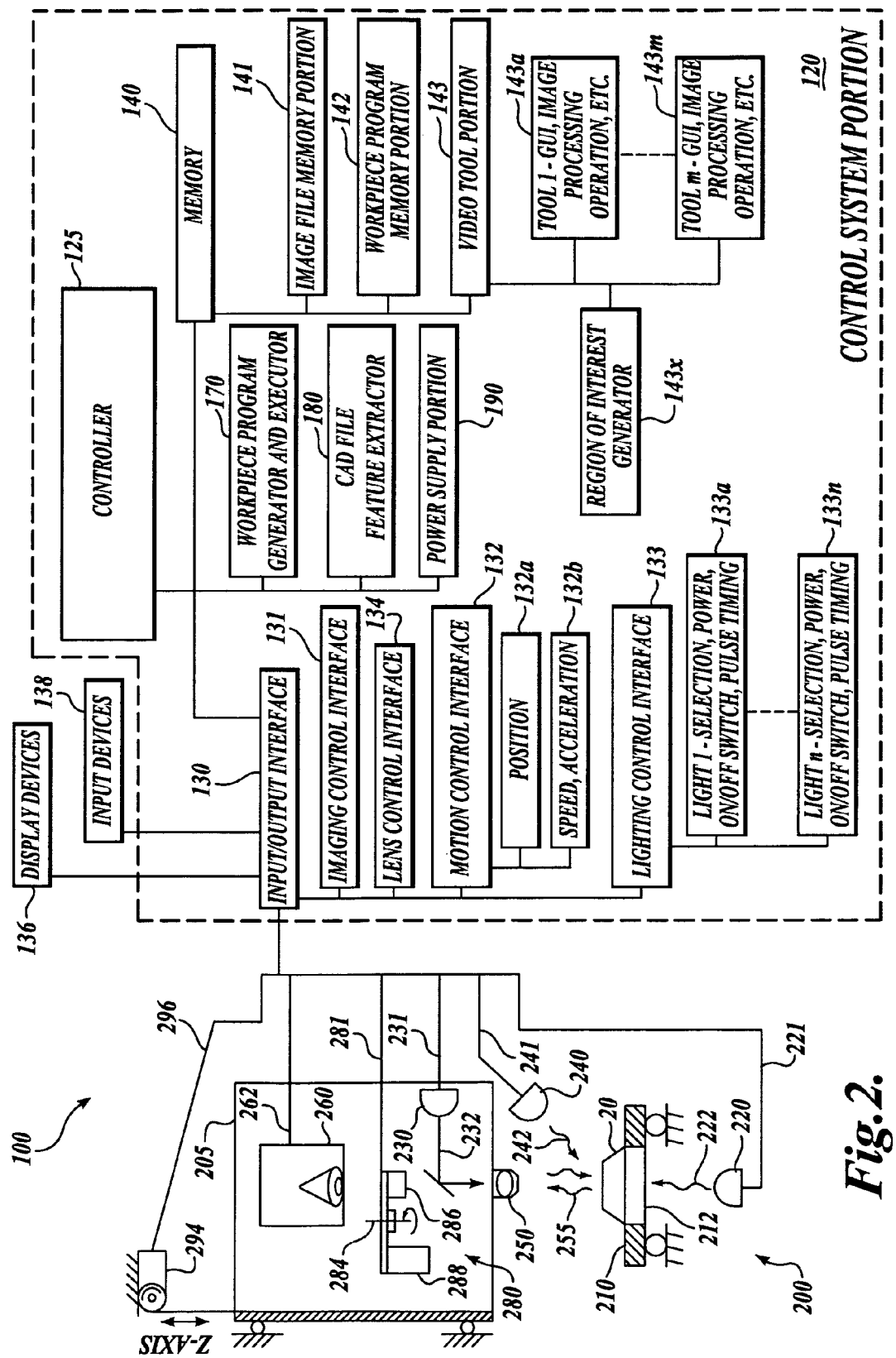
FIG. 2 is a diagram of a control system portion and a vision components portion of a machine vision inspection system.

FIG. 2 is a diagram of a control system portion 120 and a vision components portion 200 of a machine vision inspection system 100 in accordance with the present invention. As will be described in more detail below, the control system portion 120 is utilized to control the vision components portion 200. The vision components portion 200 includes an optical assembly portion 205, light sources 220, 230 and 240, and a workpiece stage 210 having a central transparent portion 212. The workpiece stage 210 is controllably movable along X and Y axes that lie in a plane that is generally parallel to the surface of the stage where a workpiece 20 may be positioned. The optical assembly portion 205 includes a camera system 260, an interchangeable objective lens 250, and may include a turret lens assembly 280, and the coaxial light source 230. Alternatively to the turret lens assembly, a fixed or manually interchangeable magnification-altering lens, or a zoom lens configuration, or the like, may be included. The optical assembly portion 205 is controllably movable along a Z axis that is generally orthogonal to the X and Y axes, by using a controllable motor 294, as described further below.

A workpiece 20 that is to be imaged using the machine vision inspection system 100 is placed on the workpiece stage 210. One or more of the light sources 220, 230 and 240 emits source light 222, 232, or 242, respectively, that is usable to illuminate the workpiece 20. Light emitted by the light sources 220, 230 and/or 240 illuminates the workpiece 20 and is reflected or transmitted as workpiece light 255, which passes through the interchangeable objective lens 250 and the turret lens assembly 280 and is gathered by the camera system 260. The image of the workpiece 20, captured by the camera system 260, is output on a signal line 262 to the control system portion 120.

The light sources 220, 230, and 240 that are used to illuminate the workpiece 20 can include a stage light 220, a coaxial light 230, and a surface light 240, such as a ring light or a programmable ring light, all connected to the control system portion 120 through signal lines or busses 221, 231 and 241, respectively. As a primary optical assembly of the machine vision inspection system 100, the optical assembly portion 205 may include, in addition to the previously discussed components, other lenses, and other optical elements such as apertures, beam-splitters and the like, such as may be needed for providing coaxial illumination, or other desirable machine vision inspection system features. When it is included as a secondary optical assembly of the machine vision inspection system 100, the turret lens assembly 280 includes at least a first turret lens position and lens 286 and a second turret lens position and lens 288. The control system portion 120 rotates the turret lens assembly 280 along axis 284, between at least the first and second turret lens positions, through a signal line or bus 281.

The distance between the workpiece stage 210 and the optical assembly portion 205 can be adjusted to change the focus of the image of the workpiece 20 captured by the camera system 260. In particular, in various exemplary embodiments, the optical assembly portion 205 is movable in the vertical Z axis direction relative to the workpiece stage 210 using a controllable motor 294 that drives an actuator, a connecting cable, or the like, to move the optical assembly portion 205 along the Z axis. The term Z axis, as used herein, refers to the axis that is intended to be used for focusing the image obtained by the optical assembly portion 205. The controllable motor 294, when used, is connected to the input/output interface 130 via a signal line 296.

As shown in FIG. 2, in various exemplary embodiments, the control system portion 120 includes a controller 125, an input/output interface 130, a memory 140, a workpiece program generator and executor 170, a CAD file feature extractor 180, and a power supply portion 190. It will be appreciated that each of these components, as well as the additional components described below, may be interconnected by one or more data/control buses and/or application programming interfaces, or by direct connections between the various elements.

The input/output interface 130 includes an imaging control interface 131, a motion control interface 132, a lighting control interface 133, and a lens control interface 134. The motion control interface 132 includes a position control element 132a, and a speed/acceleration control element 132b. However, it should be appreciated that in various exemplary embodiments, such elements may be merged and/or indistinguishable. The lighting control interface 133 includes lighting control elements 133a-133n which control, for example, the selection, power, on/off switch, and strobe pulse timing if applicable, for the various corresponding light sources of the machine vision inspection system 100, such as the light sources 220, 230, and 240.

The memory 140 includes an image file memory portion 141, a workpiece program memory portion 142 that may include one or more part programs, or the like, and a video tool portion 143. The video tool portion 143 includes tool portions 143a-143m, which determine the GUI, image processing operation, etc., for each of the corresponding tools. The video tool portion 143 also includes a region of interest generator 143x that supports automatic, semi-automatic and/or manual operations that define various regions of interest that are operable in various video tools included in the video tool portion 143. In general, the memory portion 140 stores data usable to operate the vision system components portion 200 to capture or acquire an image of the workpiece 20 such that the acquired image of the workpiece 20 has desired image characteristics. The memory portion 140 further stores data usable to operate the machine vision inspection system 100 to perform various inspection and measurement operations on the acquired images, either manually or automatically, and to output the results through the input/output interface 130. The memory portion 140 also contains data defining a graphical user interface operable through the input/output interface 130.

The signal lines or busses 221, 231 and 241 of the stage light 220, the coaxial light 230, and the surface light 240, respectively, are all connected to the input/output interface 130. The signal line 262 from the camera system 260 and the signal line 296 from the controllable motor 294 are connected to the input/output interface 130. In addition to carrying image data, the signal line 262 may carry a signal from the controller 125 that initiates image acquisition.

One or more display devices 136 and one or more input devices 138 can also be connected to the input/output interface 130. The display devices 136 and input devices 138 can be used to view, create and/or modify part programs, to view the images captured by the camera system 260, and/or to directly control the vision system components portion 200. In a fully automated system having a predefined part program (or workpiece program), the display devices 136 and/or the input devices 138 may be omitted.

With regard to the CAD file feature extractor 180, information, such as a CAD file representing a workpiece, or a previous image of a substantially identical workpiece, is frequently available in industrial applications of machine vision inspection systems. In the case of a CAD file representation, it should be appreciated that the locations of edges and boundaries in the CAD file representation may be determined manually, in a semi-automated fashion, or fully automatically from a CAD representation, by a variety of known methods of CAD file feature extraction.

In various exemplary embodiments, when a user utilizes the machine vision inspection system 100 to create a workpiece image acquisition program for the workpiece 20, the user generates workpiece program instructions either by explicitly coding the instructions automatically, semi-automatically, or manually, using a workpiece programming language, or by generating the instructions by moving the machine vision inspection system 100 through an image acquisition training sequence such that the workpiece program instructions capture the training sequence. This process is repeated for multiple images in a set of images that are to be captured. These instructions, when executed, will cause the machine vision inspection system to manipulate the workpiece stage 210 and/or the camera system 260 at certain speed(s) such that a particular portion of the workpiece 20 is within the field of view of the camera system 260 and at a desired focus state for each of a set of images to be acquired. In addition to the program instructions that control the relative movement of the camera and the workpiece, the workpiece image acquisition program also needs to include program instructions that activate one or more of the light sources 220-240 to provide a desired illumination of the workpiece 20 during each image acquisition.

Once a set of workpiece image acquisition instructions are defined, in various exemplary embodiments of the present invention, the control system 120 executes the instructions and commands the camera system 260 to capture one or more images of the workpiece 20 according to the instructions. The control system 120 will then, under control of the controller 125, input the captured image(s) through the input/output interface 130 and store the captured image(s) in the memory 140. The controller 125 may also display the captured images on the display device 136.

The control system portion 120 is further usable to recall captured and stored workpiece inspection images, to inspect and analyze workpiece features in such workpiece inspection images, and to store and/or output the inspection results. These methods are typically embodied in various video tools included in the video tool portion 143 of the memory 140. Such tools may include, for example, edge/boundary detection tools (one example of which is disclosed in U.S. patent application Ser. No. 09/987,986, incorporated by reference herein), shape or pattern matching tools, dimension measuring tools, coordinate matching tools, and the like. For example, such tools are routinely used in a variety of commercially available machine vision inspection systems, such as the QUICK VISION® series of vision systems and the associated QVPAK® software, discussed above.

Video edge/boundary detection tools available in QVPAK® software include, for example, Point tool, Box tool, Circle tool, and Arc tool (see QVPAK 3D CNC Vision Measuring Machine User's Guide, incorporated by reference above). Briefly, a Point tool generates (locates) a data point at the intersection of a single scan line on an image. A Box tool generates a series of parallel scan lines, each of which returns a data point where an edge feature is found. A Circle tool generates a series of radial scan lines through 360 degrees centered about an origin, each of which returns a point where an edge feature is found. An Arc tool generates a series of radial scan lines centered about an origin, each of which returns a point where an edge feature is found (useful for returning data points from a rounded corner, for example). Each of these tools is used to automatically detect a particular edge/boundary feature in an image.

After the image inspection/analysis operation using one or more of these video tools is completed, the control system 120 outputs the results of each analysis/inspection operation to the input/output interface for outputting to various display devices 136, such as a video display, printer, and the like. The control system 120 may also store the results of each inspection operation in the memory 140.

As discussed in the background section above, a video tool may fail to operate properly for various reasons, for example, when at least some of the parameters that affect the operation of the video tool are incorrectly set or various unforeseen variations in part fabrication, part fixturing, vision machine degeneration, ambient lighting condition, and the like, contribute to a set of operating conditions that are not suitable for the proper operation of the video tool according to its previously established operating parameters. When a video tool fails, the control system 120 outputs an error message, for example, on a video display, notifying the user that the operation of the tool has failed to produce any analysis/inspection results. In such a case, previously, the user was forced to recover the tool manually. The present invention, on the other hand, is directed to providing a method and system for automatically recovering a failed video tool, for example, according to automatic recovery instructions that may be included in one or more portions of the memory 140.

Figure 3A:
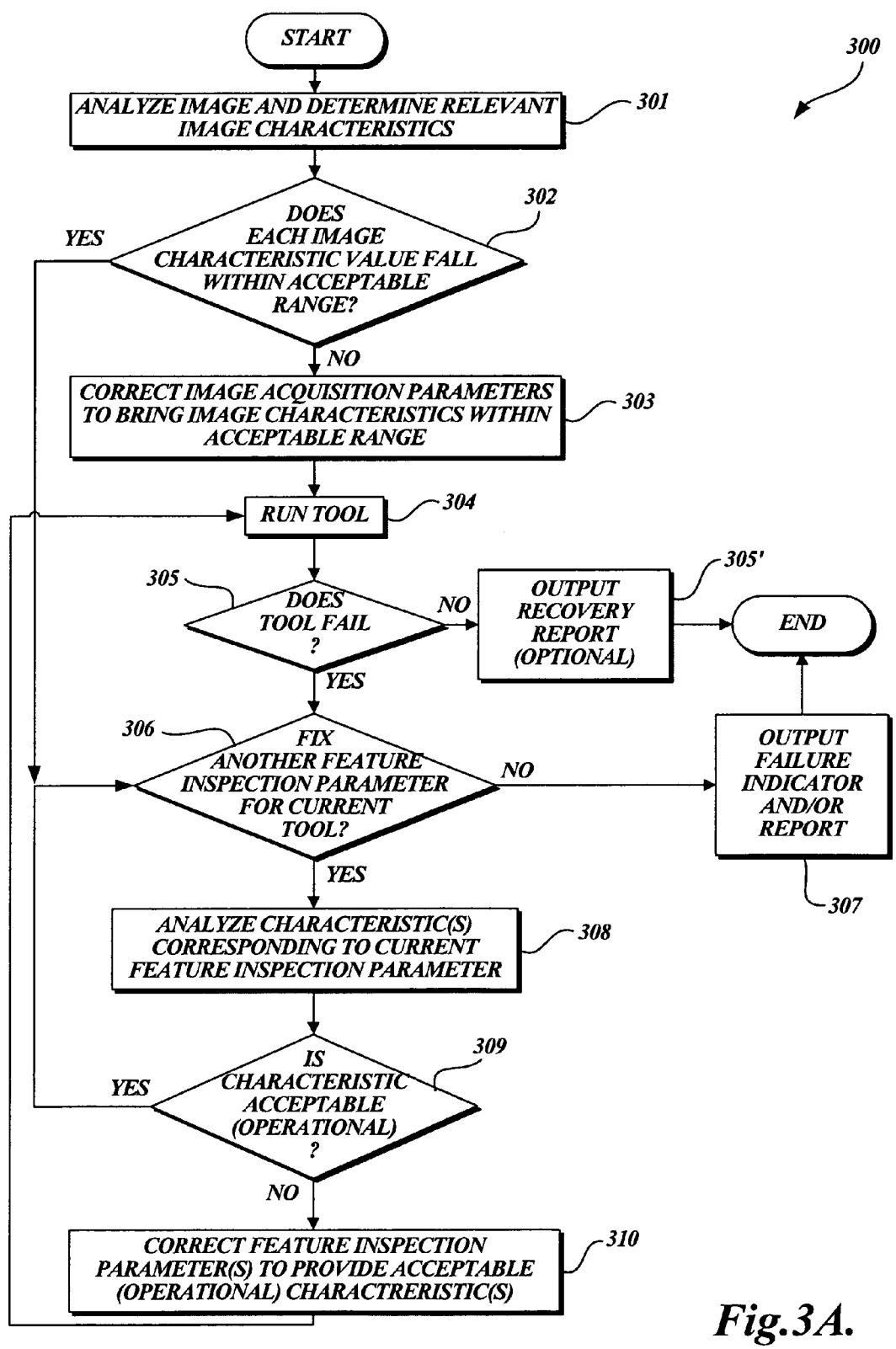
FIG. 3A is a flow diagram illustrative of one embodiment of a routine for automatically recovering a failed video tool in accordance with the present invention.

FIG. 3A is a flow chart illustrating one relatively general embodiment of an automatic tool recovery routine 300 in accordance with the present invention. After a tool fails to operate properly in a current image, at block 301, the current image is analyzed to determine and record various relevant image characteristics. For example, an average brightness of the image, a number of oversaturated pixels in the image, a value indicating the focus state of the image, etc., are calculated and recorded. As used herein, image characteristic values include any value that is indicative of some characteristic or quality of an acquired image. In some cases, the image characteristics value may simply be a representation of the presence or absence of a condition or characteristic. Various methods and video tools that are useful for determining such image characteristic values (for example, average brightness, oversaturation, focus state, etc.) are available, for example, in the QVPAK® software discussed above. The previously incorporated '180 patent and '986 application describe methods for determining image characteristics related to edge visibility, contrast, and other characteristics that may be applicable for various images, in greater detail. Other useful characteristics and methods of their determination will be apparent to one skilled in the art, on the basis on this disclosure.

At a decision block 302, an evaluation is made whether the various relevant image characteristics determined in the operations of block 301 are acceptable. In some cases, quantitative values are compared to an acceptance range. In other cases, presence or absence indicators are compared to their desired states. In any case, if all of the evaluated image characteristics are acceptable then operation jumps to the operations of block 306. If any of the evaluated image characteristics are not acceptable, then operation continues at the operations of block 303.

In the operations of block 303, appropriate feature inspection parameters (in this case, one or more image acquisition parameters) are adjusted to make the evaluated image characteristics acceptable. For example, if at block 302 the average brightness or intensity value of the image was determined to be too low, at block 303 the hardware/software parameters affecting the average brightness value, such as a light power level parameter, are adjusted. As another example, one or more evaluation tools such as the tools disclosed in the previously incorporated '180 patent and '986 application may be automatically run, and the appropriate image acquisition parameters and/or tool parameters may be automatically adjusted according to the results. As another example, a comprehensive automatic lighting selection and adjustment tool such as that disclosed in U.S. Pat. No. 6,627,863 to Wasserman, which is incorporated herein by reference in its entirety, may be used. Similarly, autofocus tools included in many commercially available machine vision inspection systems may be used. As a further example, appropriate image acquisition parameters and/or tool parameters may be varied within a reasonable range from their initial settings, and the image characteristic results of each variation evaluated until acceptable image characteristic results are obtained, or, alternatively, until the video tool operates properly. More generally, the parameter adjustment may be performed according to any now known or later developed methods.

Once the appropriate image acquisition parameters are adjusted and the evaluated image characteristics are made acceptable at block 303, at block 304 the video tool is run based on the resulting adjusted image. Of course, if the video tool was run for the same image as part of a parameter adjustment evaluation in the operations of block 303, then, in effect, the operations of block 304 have been performed. In either case, after the video tool is run, according to the operations at a decision block 305, if the tool ran properly, then the operations of block 305' (if implemented) are performed and/or the routine ends.

The operations of block 305' may be implemented in various embodiments or applications of the routine 300, if desired. The operations of block 305' prepare and output or store a "tool recovery report". Such a report may identify the type of tool failure that occurred and what feature inspection parameter adjustments were made in order for the tool to recover, for example. Such a report may be useful for detecting or diagnosing machine degradation, unexpected or newly arising part fabrication variations, or the like. In applications where a part program is run repeatedly on similar parts, a series of such reports may be analyzed for failure and recovery trends in order to detect "process drift" for a part fabrication process, identify the need for preventative maintenance for the machine vision systems, or they may be useful for identifying one or more "best" or average feature inspection parameter adjustments that could permanently replace failure-prone counterpart parameters in the part program instructions, to prevent or reduce video tool failures during subsequent workpiece inspections.

On the other hand, if the tool failed to operate properly in the current adjusted image, then operation continues from block 305 to the operations of a decision block 306. In the operations of the decision block 306, it is decided whether there is another feature inspection parameter to be evaluated and adjusted for the current video tool. In some embodiments or applications where it is previously determined that it is too risky to automatically correct some potential causes of video tool failure (for example because the features in the image(s) are typically highly textured, or noisy, or various features are located particularly close together, or the like), automatic tool recovery operations may be configured to adjust some "low-risk" parameters (such as those that affect lighting, for example) in an attempt to recover a failed tool, but to avoid those parameter adjustments that are considered to be "high-risk" (for example, repositioning a video tool among closely spaced, highly textured, features.) This is a conservative approach that tends to decrease the chance of erroneous inspection results while increasing the need for operator intervention to recover a failed video tool. Conversely, in some embodiments or applications where many types of automatic parameter adjustments are low-risk (for example, when a workpiece feature to be inspected is generally sufficiently isolated on a predictably low-texture workpiece) automatic tool recovery operations may be configured to attempt to adjust all available automatically-adjustable parameters. Thus, the specific types of parameters, or individual parameters, that are to be included in automatic recovery attempts, may be specified as a default condition in various embodiments, or configured for a particular application or individual feature or video tool in various other embodiments (for example based on operator input during learn mode operations.) In any case, the allowable automatic parameter adjustment candidates are defined in a manner that supports the decision operations of decision block 306. If there are no additional feature inspection parameters to be evaluated and adjusted at the decision block 306, either due to their prohibition, or because their attempted adjustment has been exhausted, then operation continues to block 307, where a tool failure indicator and/or report is output, and the routine ends. The failure indicator may alert a user to intervene to achieve the proper operation of the tool. For example, failure of the video tool may be due to a mechanical malfunction that cannot be corrected by adjusting hardware/software parameters (e.g., the light bulb is out) and accordingly user intervention may be required.

On the other hand, if it is decided at decision block 306 that there is another feature inspection parameter to be evaluated and adjusted for the current video tool, then the operations of a block 308 are performed. At block 308, the current image (which may generally be an "improved" image resulting from previous parameter adjustments in the routine 300) is analyzed relative to certain characteristics and/or processes and/or parameters associated with the current feature inspection parameter to be evaluated and adjusted. For example, if the feature inspection parameter to be evaluated is a parameter related to insuring that the expected feature, such as an edge, is present in the video tool region of interest in the current image, then the region of interest may be examined to determine the presence and/or magnitude of any intensity gradients indicative of the edge. (It should be appreciated that the requirements for indicating the presence of an edge may be different than those required for accurately measuring the edge location.) Then, at a block 309, the results for the various characteristics or factors analyzed in the operations of block 308 are evaluated to determine whether they are acceptable for supporting the proper operation of the video tool. If the results are acceptable, then operation returns to the decision block 306 where it is decided whether there is another feature inspection parameter to be evaluated and adjusted. Otherwise, if the results are unacceptable, then operations continue at the block 310.

In the operations of block 310, appropriate feature inspection parameters are adjusted such that the characteristics and/or processes and/or parameters associated with the current feature inspection parameter are acceptable for providing proper operation of the tool. For example, if at decision block 309 it was decided that no gradients indicative of an edge were found in the region of interest of an edge tool, then at block 310 operations may be performed to search within a reasonable tolerance range around the region of interest, in order to locate the (presumed) misaligned edge feature and adjust the region of interest location parameters accordingly. Such operations are described in greater detail below. Once such corrections are made to insure that the current feature inspection parameter(s) support proper operation of the tool, operation returns to block 304, where the tool is run again based on the adjusted parameters. The operations of blocks 304-310 are repeated until the routine ends either because the tool runs successfully, or because the adjustment parameters that are allowed or available for automatic recovery operations are exhausted without success.

As more fully described below, in various exemplary embodiments of the present invention, the order in which various image characteristics and/or other feature inspection parameters are considered is important for maximizing the efficiency in tool recovery. Specifically, some image and/or tool parameters have to be evaluated and/or adjusted first to allow evaluation and/or adjustment of other parameters (e.g. image focus can be best evaluated and adjusted after it is insured that image brightness is adjusted correctly). Another consideration is that some reasons for a tool failure occur more frequently than others, providing a reason to evaluate the related parameters early in an automatic recovery sequence. Another consideration is that some feature inspection parameters are easier or faster to correct than others. For example, when LED lighting is used, lighting variations can be evaluated, adjusted, and tested, much faster than a workpiece can be repositioned. Accordingly, adjusting such "rapidly adjustable" parameters early in a recovery sequence may result in faster execution of the recovery in many cases. Accordingly, those image characteristic values that manifest more frequent reasons for a tool failure and/or are easier to correct and/or have to be corrected to enable evaluation and/or correction of other parameters should be considered and corrected first in order to most efficiently complete the automatic tool recovery process. In various exemplary embodiments of the present invention, for example, image characteristic values indicative of the lighting and/or focusing quality of an acquired image are considered and corrected first, as will be more fully described below in reference to FIG. 3B.

It should be appreciated that using known fuzzy logic or neural programming training methods, associations can be "predetermined" between the results of the characteristic analyses performed in the operations of blocks 301 and 308, and the parameters that are generally effective for correcting the observed pattern of results from the characteristic analysis. That is, "classifiers" may be developed or trained according to known methods using a set of typical images and failures. The classifiers may be applied to the results of the characteristic analyses, for example in the operations of the blocks 302-303 and/or 308-309, in order to classify the results and select the corresponding parameter adjustments that are known to be effective for correcting that class of failures. Such methods are known to provide robust and rapid failure analysis in many applications. However, even when such techniques are used, it may still be advantageous to first apply a first set of classifiers to a first set of characteristics appropriate to those characteristic values that manifest more frequent reasons for a tool failure and/or are easier or faster to correct and/or have to be corrected to enable evaluation and/or correction of other parameters. This may be followed by applying a second set of classifiers to a second set of characteristics appropriate to those characteristic values that manifest less frequent reasons for a tool failure and/or are more difficult or time consuming to correct and/or that are best corrected after the correction of other parameters, in order to most efficiently complete the automatic tool recovery process. For example, the first set of characteristics and classifiers may relate primarily to image acquisition parameters related to brightness and focus, and the second set of characteristics and classifiers may relate to feature inspection parameters that require a properly illuminated and focused image for their evaluation and adjustment, which may include, for example, parameters related to positioning, orientation, and/or feature-specific edge detection parameters that can insure accurate measurement results (which may include a gradient-related threshold parameter and/or intensity-change-across-the-edge threshold parameter, for example), and the like.

Figure 3B:
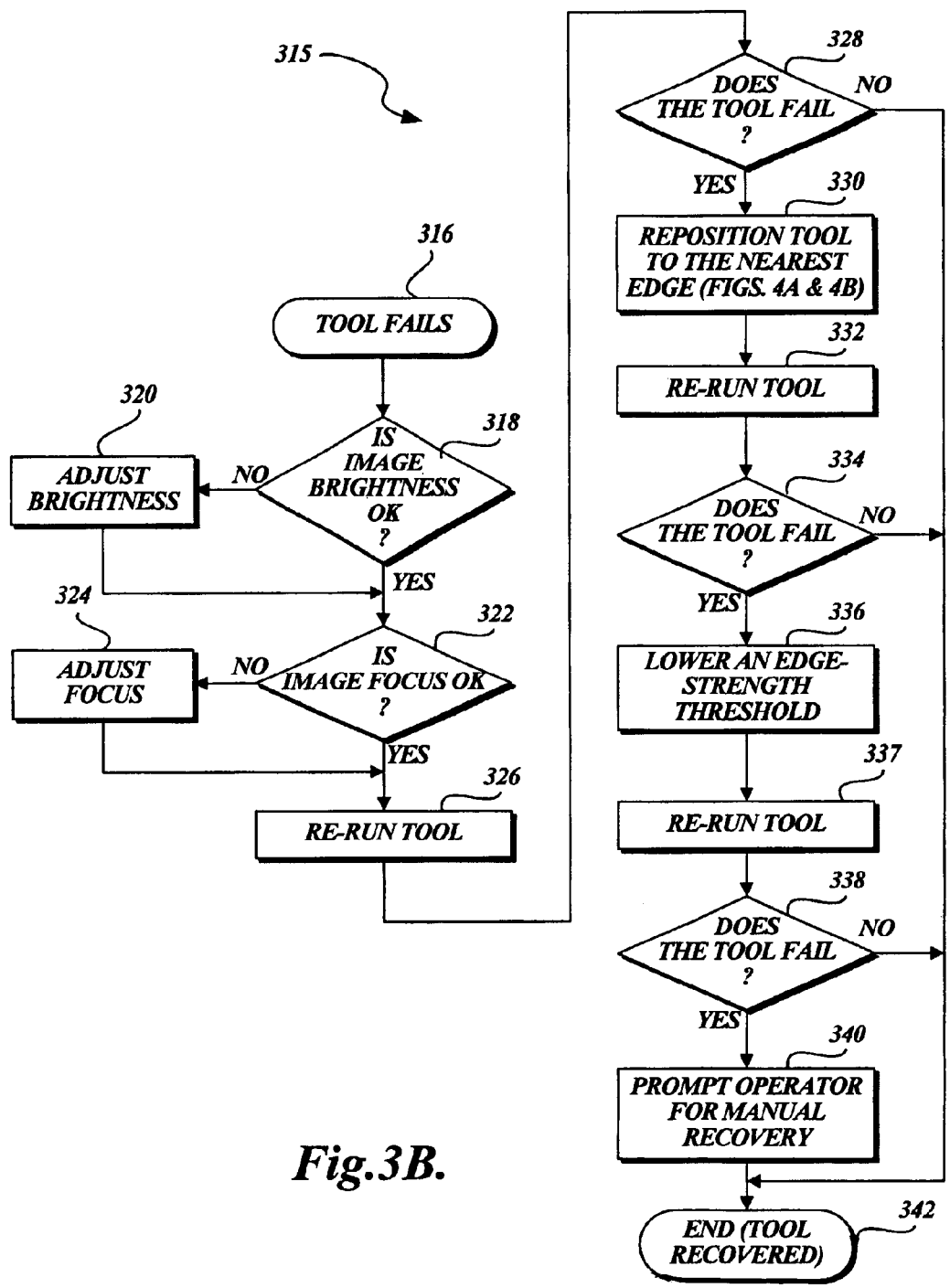
FIG. 3B is a flow diagram illustrative of another embodiment of a routine for automatically recovering a failed video tool in accordance with the present invention.

FIG. 3B is a flow chart illustrating a relatively detailed routine 315 that is one possible specific embodiment for automatically recovering a video tool. The routine 315 involves addressing generally four types of reasons that may have caused a video tool to fail: improper lighting, improper focus, improper positioning or orientation of a video tool relative to a feature in an image, and one or more improper edge detection parameters. The routine 315 addresses these reasons in this order because in many cases correcting some potential reasons for a tool failure is a prerequisite for the reliable evaluation and correction of other failure reasons (e.g. evaluating focus is best or most reliably done only after a proper image illumination level is ensured). It should be apparent to one skilled in the art that the order in which these various reasons are addressed may be changed depending on various assumptions or judgments that are valid for a specific application, and further that more or fewer reasons may be addressed in a particular routine depending on a specific application. The order presented in routine 315 is generally advantageous for the combination of failure causes and parameter adjustments considered in the routine.

At block 316, when a video tool fails, the operations at decision block 318 commence, where the brightness of an image is evaluated and it is determined whether it is within an acceptable range. For example, within the video tool's region of interest, an average brightness and/or a number of oversaturated pixels is calculated and compared against a predefined acceptable range for each value. If the brightness of an image is not within an acceptable range, at least in the region of interest, then at block 320 suitable hardware/software parameters that affect the brightness of an acquired image are adjusted. For example, the number/types of light sources to be used and the light power level of each light source may be adjusted. In this connection, various tools that automatically or semi-automatically set an optimal lighting level may be used. For example, the methods described in the previously incorporated '863 patent, or Lighting Wizard™ available in the QVPAK® software, discussed above, may be used. Briefly, Lighting Wizard™ automatically finds an optimal lighting level for acquiring an image by taking several images at different combinations of lighting settings, simulating and interpolating further combinations of lighting settings by selectively superimposing simulated images, and identifying an optimal combination of lighting settings based on the best simulated/interpolated image. As another example, a Dual Area Contrast tool may be used, which uses a the method described in the previously incorporated '180 patent, or available in the QVPAK® software discussed above, to repeatedly and automatically analyze two selected image areas on opposite sides of an edge, and adjust the lighting to maximize the brightness and/or contrast difference between the two areas, to enhance the gradient that defines the edge. After suitable hardware/software parameters have been adjusted to presumably correct the brightness of an image, or when at block 318 it is determined that the brightness of the image is already within an acceptable range and needs no adjustment, then at block 322 it is determined whether the focus of an image is within an acceptable range. To this end, various tools or methods that automatically or semi-automatically determine the focus state of an image, which are now available or may be developed in the future, may be used. If the focus is determined to be unacceptable, then at block 324, suitable hardware/software parameters that affect the focus state are adjusted. For example, the distance between the workpiece stage 210 and the optical assembly portion 205 (see FIG. 2) can be adjusted to change the focus. Also, various tools that automatically or semi-automatically achieve an optimal focus may be used. For example, the AutoFocus tool available in QVPAK® software, discussed above, may be used, which takes plural images of a portion of the workpiece while adjusting the camera along the Z axis relative to the workpiece, and based on the analysis of the acquired images selects the camera position that produces the best-focused image.

After suitable hardware/software parameters have been adjusted to presumably correct the focus state of an image, or when at block 322 it is determined that the focus of the image is already within an acceptable range and needs no adjustment, then at block 326 the video tool is re-rerun. Alternatively, note that it is possible to re-run the tool right after the brightness adjustment is done at block 320 and before the image focus is checked at block 322 (for example if an image is acquired to evaluate any lighting adjustments, it may be trivial to run the tool as well), though in various applications it may be more efficient to re-run the tool after both the brightness and focus adjustments are completed because either one or both of these in combination are frequently the reasons for a tool failure. Of course if no adjustments have been made because the brightness and focus were found to be acceptable at both of blocks 318 and 322, then rerunning the tool at block 326 provides no new information, and the operations of block 326 may be skipped.

At block 328 it is determined whether the re-run tool has failed. If not, then operation jumps to block 342 and the routine 315 ends (e.g., the tool has been successfully recovered). On the other hand, if the re-run tool fails again, it is presumed that the next most likely cause of failure is that the tool, or, more specifically the region of interest of the tool, is not properly positioned or oriented relative to a target edge/boundary to be detected. Therefore, at block 330 the tool is repositioned and/or reoriented to the nearest edge feature so as to bring the target edge/boundary within the tool's region of interest. This process will be described in greater detail with reference to FIGS. 4A and 4B below.

After the repositioning and/or reorienting operations of block 330, the tool is again re-run at block 332. At block 334 it is determined whether the tool has failed. If not, the tool has been successfully recovered so the routine ends at block 342. If the tool has failed again, then operation continues at the operations of block 336, where an edge detection threshold parameter, such as an edge strength threshold, is adjusted. Typically, an edge strength threshold is lowered in the case of a tool failure. The use of various types of edge detection thresholds that have parameters that are "trained" or set based on actual edge images characterized during learn mode operations, is common. Such techniques provide parameters that tend to indicate the "identity" of an edge, as well as providing parameters or limits that reject edge feature images that exhibit gradients that may produce relatively poor edge location inspection accuracy. As described fully in the QVPAK 3D CNC Vision Measuring Machine User's Guide and the QVPAK 3D CNC Vision Measuring Machine Operation Guide, incorporated above, an edge detection threshold is used to set the threshold level at which the video tool recognizes a target edge/boundary feature. Specifically, an edge/boundary detection tool recognizes a light intensity change as an edge/boundary to be detected. Thus, in its simplified form, an edge detection threshold defines the amount of light intensity change that an edge/boundary detection tool recognizes as indicative of the presence of a target edge/boundary. For example, if the edge detection threshold is set high, the edge/boundary detection tool recognizes an edge/boundary only upon detecting a relatively large amount of light intensity change between two adjacent regions. Accordingly, when the threshold is set high, the tool can detect only a relatively well-defined crisp, or "strong" edge, between two regions in high contrast to each other. On the other hand, if the edge detection threshold is set low, the edge/boundary detection tool can recognize even a relatively small amount of light intensity change as indicative of the presence of an edge/boundary. Therefore, when the threshold is set low, the tool can detect a not-so-well defined blurred edge, or a "weak" edge, as well as a strong edge. At block 336 an edge detection threshold is lowered on the assumption that the tool has failed to recognize a target edge/boundary because the threshold was initially set too high. In general, the higher the edge detection threshold is, the more likely it is that an image will support good edge location measurement accuracy, but the more frequently the video tool will fail. Conversely, when the threshold is set relatively low, the video tool rarely fails, but the likelihood of accepting false positives (detecting noise as edges), or of accepting poor measurement accuracy, is increased. Initially, a threshold may be set or trained to accept only edge gradients that support the best edge selectivity and measurement accuracy. However, in the event of tool failure, in many cases a lower threshold will allow the tool to run successfully (that is, the threshold limits will not be violated by the edge gradient characteristics), and adequate (but not optimal) selectivity and accuracy may still be obtained.

After threshold adjustment at block 336, at block 337 the tool is re-run. At block 338 it is determined whether the tool has failed. If not, the tool has been successfully recovered so the routine ends at block 342. On the other hand, if the tool has failed again, then at block 340 the routine issues an error indicator, which may be a prompt to the operator (user) to recover the tool manually. For example, the reason for the tool failure may be a mechanical malfunction that requires user intervention. The operator then manually recovers the tool.

In one alternative embodiment, if a set of recovery operations fails to provide proper operation of the video tool at the operations of block 338, the current video tool may be replaced by a predetermined "substitute" video tool that provides a similar inspection result. In general a "substitute" video tool operates somewhat differently than the tool that it replaces and therefore has a chance of operating successfully. For example, a conventional edge detection tool that operates based on intensity gradients in the workpiece image may fail due to marginal lighting effectiveness, or textured surfaces surrounding and obscuring an edge, or the like. In such a case, the recovery operations may include replacing the conventional edge detection tool with a boundary detection tool based on color or texture variations, or the like. Such a "replacement" tool may not be preferred initially because it takes longer to execute, or provides lower-accuracy results, for example. For example, one such tool is a robust boundary detection tool that is usable to replace conventional edge tools is described in the previously incorporated '986 application. If such a tool substitution is made after the operations of block 338, then the region of interest of the substitute tool is positioned to replace the region of interest of the previous tool, and the tool is run on a current image or a newly acquired image. If the substituted tool operates successfully, then the routine ends. Otherwise, the routine 315 is continued (repeated) beginning at the operations of block 318.

Figure 4A:
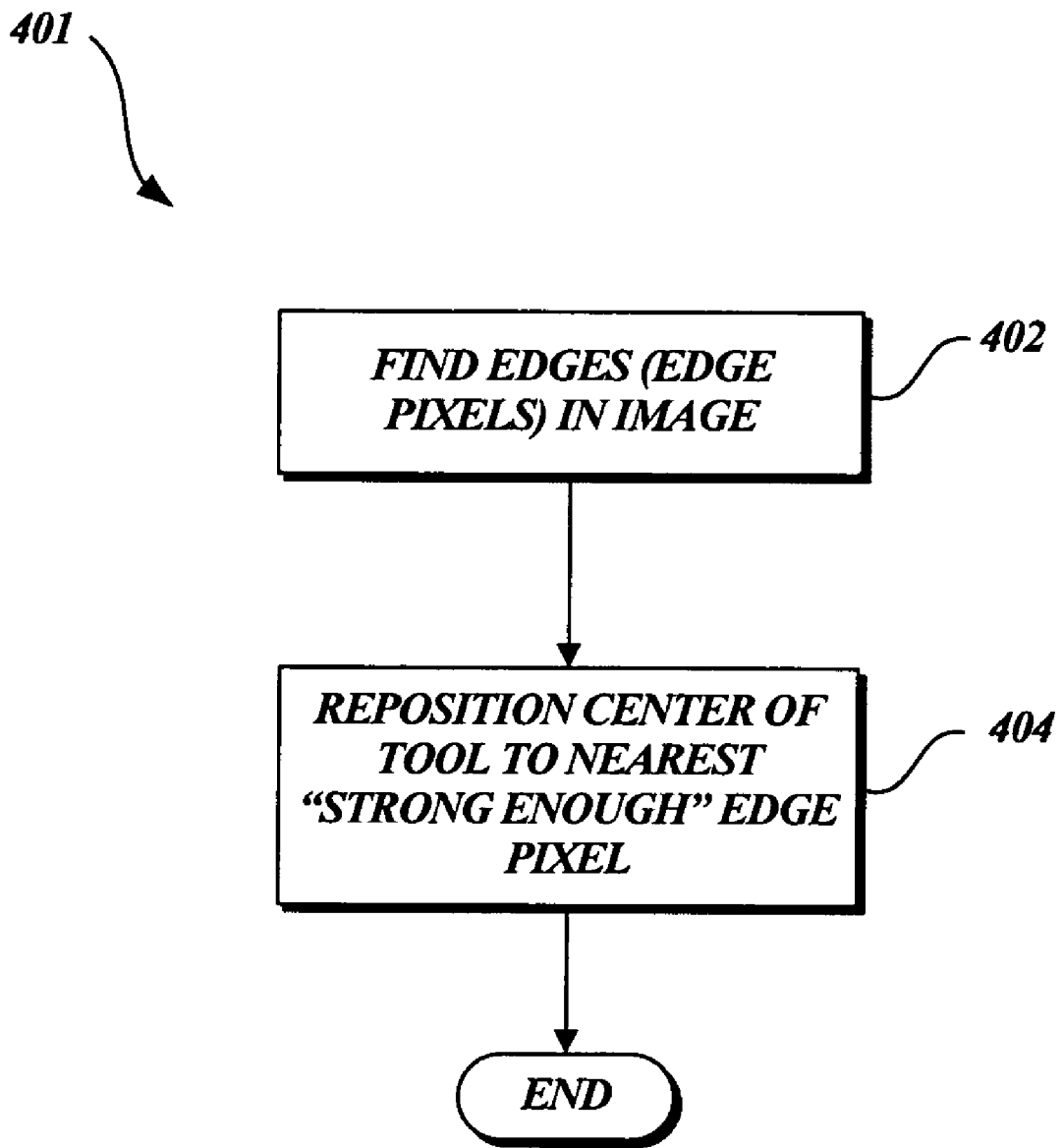
FIGS. 4A and 4B each depict a flow diagram illustrative of a routine for repositioning a failed video tool relative to a nearest edge feature, which may be performed as part of various embodiments of a routine for automatically recovering a failed video tool.
Figure 4B:
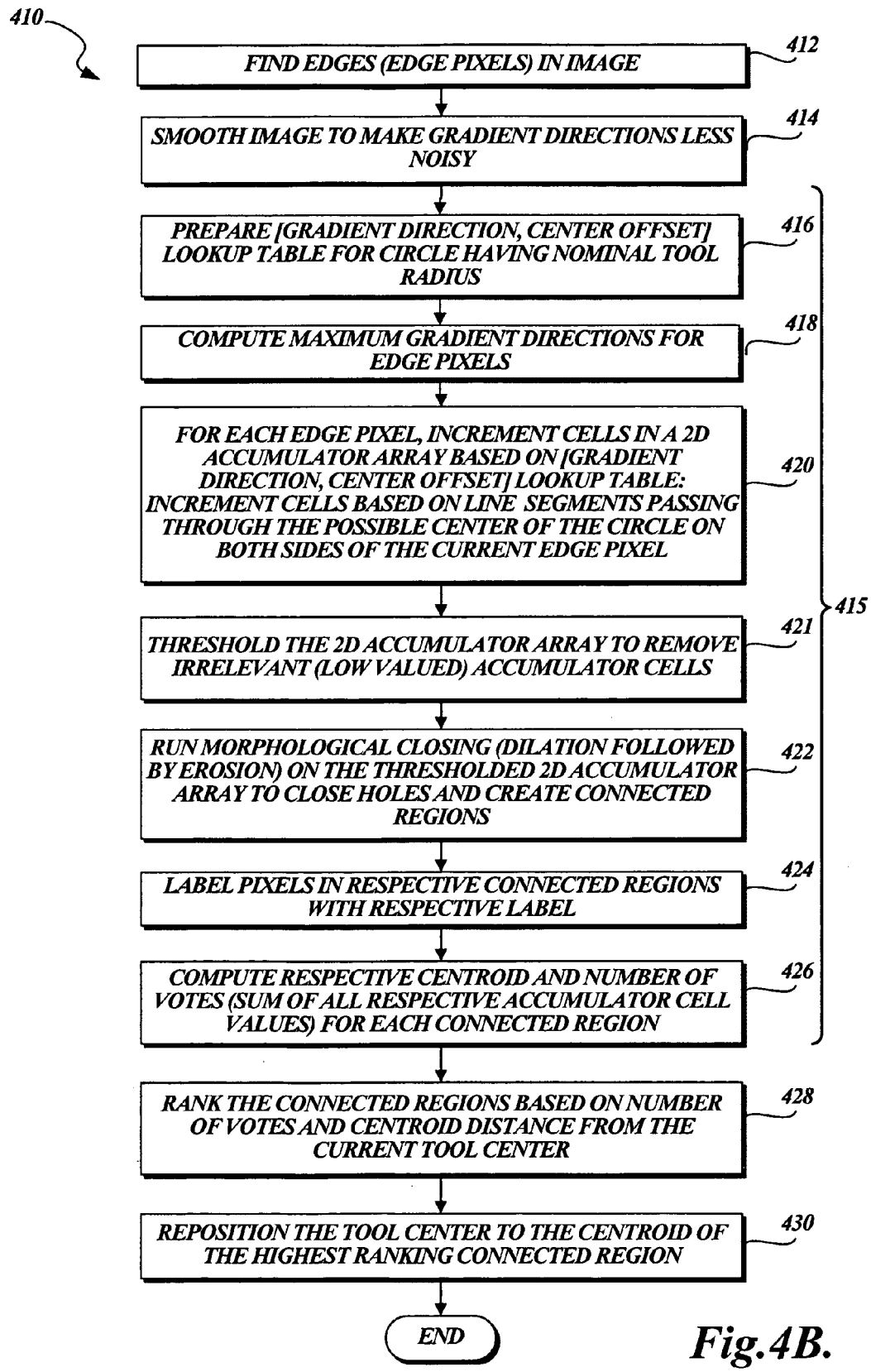

FIGS. 4A and 4B each depict a flow diagram illustrative of a routine for repositioning (which, in the case of FIG. 4A, may included reorienting) a failed video tool relative to a nearest edge, which may be performed at block 330 in some embodiments of the routine 315 shown in FIG. 3B. FIG. 4A illustrates a routine 401 that may be used to effect repositioning of an edge tool, such as a Box tool that detects numerous points along an edge (generally a straight edge), or a Point tool that generally detects a single point along an edge, to facilitate the automatic recovery of such tools. Such tools are exemplified and described in the QVPAK® software discussed above.

When it is determined that an edge tool should be repositioned, for example when more likely causes of tool failure have been exhausted in an automatic recovery sequence, the routine 401 begins operations at block 402, where edges (or edge pixels) are found in a current image, at least in the vicinity surrounding the current region of interest. One usable edge pixel identification process will be described in greater detail with reference to FIG. 5 below. More generally, a variety of known edge detection (edge pixel identification) methods may be used, for example, the Canny edge detector. Several known edge detection methods are exemplified and described in Chapter 5 of the book *Machine Vision*, by Ramesh Jain, et al., McGraw Hill, 1995, incorporated herein by reference in its entirety. In various embodiments, the detection of edge pixels is confined to the vicinity of a tool's region of interest (which is typically somewhat larger than the box defining the region of interest of a particular video tool) so as to decrease execution time and to prevent unimportant (far away) image features from influencing or confusing the identification of the desired edge. Thus, "image" as used in reference to FIGS. 4A, 4B, and 5 means a sub-image within the original camera field of view.

Once the edge pixels are identified in the image, at block 404 operations are performed that reposition the center of the tool, or, more precisely the center of the region of interest of the tool, to the nearest "strong enough" edge pixel, for example a pixel associated with a location that exhibits a high gradient value along the direction of the scan of the associated edge tool. In some cases, the tool may also be reoriented, if rotational misalignment recovery is desired in an application. The orientation of a straight edge including the nearest "strong enough" edge pixel may be determined, for example, by using gradient direction information extracted from the nearest "strong enough" edge pixel or a group of adjacent pixels including the "strong enough" edge pixel. After the repositioning and/or reorientation are performed, the routine ends. As briefly described above with respect to an edge detection threshold, the strength of each edge can be defined in terms of an amount of light intensity change between two adjacent regions defining the edge. Thus, an edge detection threshold, or gradient threshold, or other edge detection parameter, can be set at a suitably high level by default settings, user settings, or settings derived from the edge characteristics during training of the associated tool, so that the tool is only repositioned in relation to those pixels associated with an edge strength that is sufficient to support proper operation of the tool.

Figure 6:
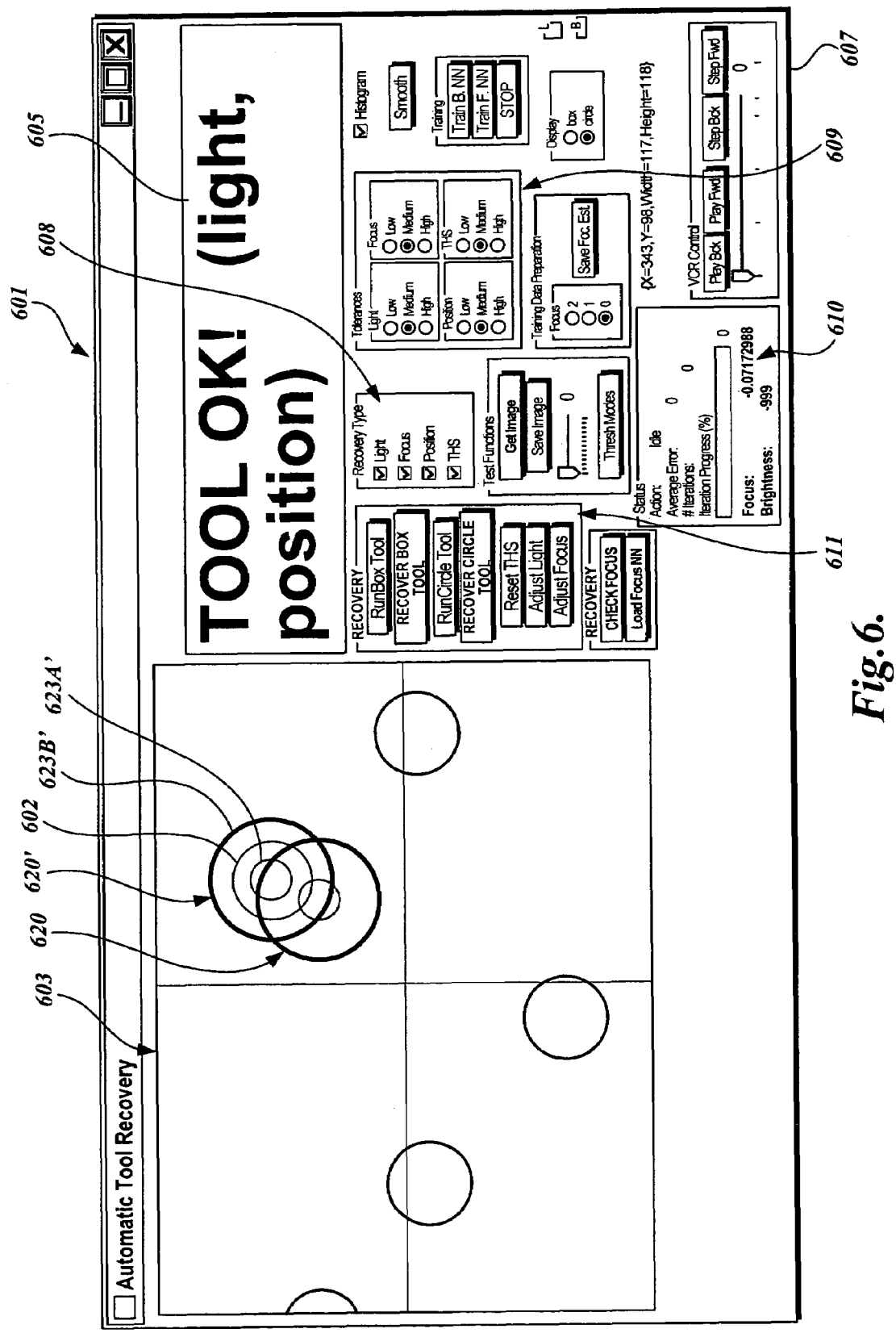
FIG. 6 is a screenshot illustrating one example of a user interface usable to configure a set of instructions for automatic tool recovery in accordance with the present invention.

FIG. 4B illustrates a routine 410 that may be used to effect repositioning of a curved edge tool, such as a Circle tool or an Arc tool. Such tools are exemplified and described in the QVPAK® software discussed above. A circle tool is shown in FIG. 6. Routine 410 is invoked when it is determined that a circle or arc tool should be repositioned, for example when more likely causes of tool failure have been exhausted in an automatic recovery sequence. The routine 410 begins operations at block 412, where edges (or edge pixels) are found in a current image, as described for the block 402 in FIG. 4A, for example. At block 414 the image is smoothed according to known image filtering techniques to make its edge pixel gradient directions less noisy.

Next, at a block 415, a Generalized Hough transform is performed. The Generalized Hough Transform is a standard tool used in image analysis, well known in the art, which generally allows finding patterns (their locations) hidden in a large amount of data. Various general aspects of the Hough transform technique may be understood from the teachings of U.S. Pat. No. 5,136,660 to Flickner, which describes a particular implementation of the technique. Generalized Hough transform applications may be further understood by referring to "Generalizing The Hough Transform To Detect Arbitrary Shapes", by D. H. Ballard, in *Pattern Recognition*, 13(2), 1981, pp. 111-122. The basic technique here is to find circle/arc patterns that can be parameterized in a suitable parameter space of two or higher dimensions.

Specifically, at block 416 a [gradient direction, center offset] lookup table is prepared corresponding to a circle of radius (R1+R2)/2, where R1 is an inner radius of the region of interest boundary of a circle or arc tool and R2 is an outer radius of the tool (see, for example, 623A' and 623B' in FIG. 6). Such a radius is a reasonable estimate of the radius of the edge feature to be located and measured by the tool. By gradient direction, we mean here the maximum gradient direction, or the nominal radial direction across a circular edge, or a portion thereof. The table is indexed by gradient direction, that is, by orientation angle in degrees relative to a reference axis.

At block 418 the gradient directions for all edge pixels resulting from the operations of blocks 412 and 414 (and not for any other pixels in the image) are computed. At block 420, for each of the edge pixels, cells in a 2D accumulator array are incremented using the [gradient direction, center offset] lookup table. Specifically, using a straightforward extension to the Generalized Hough transform, incrementing the cells is done along line segments connecting the possible centers of the circle (along the gradient direction) on both sides of the current edge pixel. The possible center positions are computed using the center offset vector from the lookup table for the gradient direction computed for the current edge pixel. The vector is added to the current pixel's coordinates to obtain the first potential circle center and subtracted to obtain the second potential circle center. Considering two potential circle centers on both sides of the edge accounts for two possible edge slopes or polarities, one associated with a rising intensity along a scan direction across the edge, and the other associated with a falling intensity across the edge.

Using line segments instead of incrementing single cells in the accumulator array allows this particular algorithm to find circles or arcs with radii that are slightly different from the nominal estimate of (R1+R2)/2. Thus, the Hough transform for circles or arcs, in this example, effectively uses a three-parameter space: the 2D accumulator array to define a position, and circle radius flexibility (the third parameter). The transform is achieved by generating values corresponding to line segments, instead of points, in the 2D accumulator array.

At block 421 the 2D accumulator array (which may be thought of as a parametric image) is thresholded to remove from further consideration all cells that accumulated insignificant values in the operations of block 420. Cells with low values do not lie on features having the expected size and shape. Both the original and the thresholded 2D accumulator arrays are stored for further reference.

At block 422 morphological closing operations (dilation followed by erosion) are run on the thresholded 2D accumulator array to close holes in regions. At block 424 connected components (regions) in the thresholded 2D accumulator array are identified according to known image processing methods (region labeling methods, or the like) and the corresponding "pixels" are labeled to indicate their membership in a particular connected region. At block 426 the centroid of each connected region is determined based the addresses of its labeled pixels, and the values of all cells corresponding to (that is, congruent with) the connected region in the original 2D accumulator array are summed to provide a "number of votes" that indicate how strongly they agree with the expected radius and shape of the feature to be located.

At block 428 all the connected regions (i.e., the candidate circle centers) are ranked based on their respective number of votes (sums of votes in each region) and distance (of their centroid) from the current tool center. For example, the values for the numbers of votes and the distances may be normalized to the same numerical range, and then for each respective connected region its respective normalized number of votes and normalized distance may be summed to provide its quantitative ranking value. At block 430 the tool is repositioned such that the center of its associated circle is positioned at the centroid of the connected region having the highest ranking value, i.e., to align with the most probable center of the misaligned feature to be analyzed by the tool. Then the routine ends.

Figure 5:
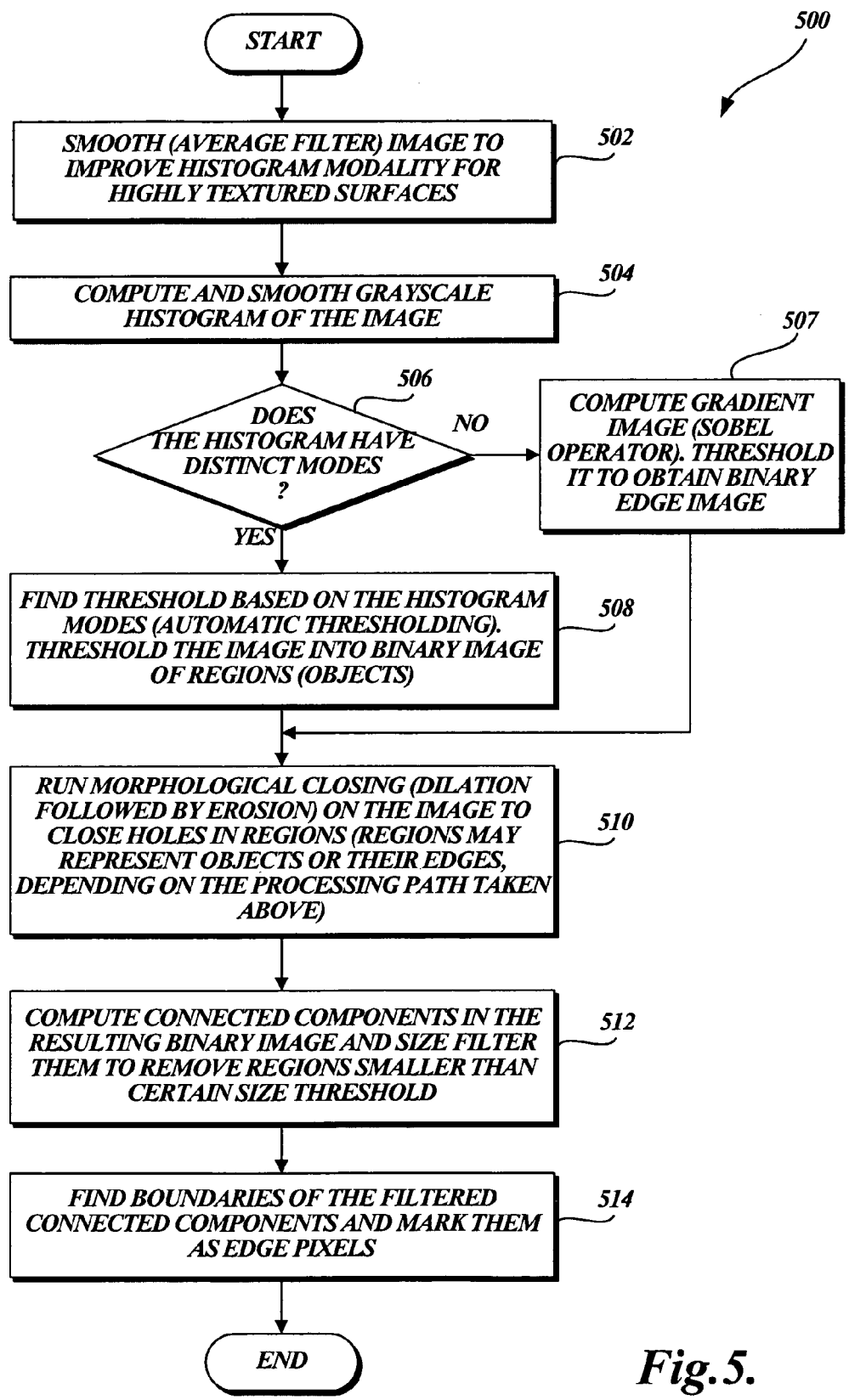
FIG. 5 is a flow diagram illustrative of a routine for finding edges in an image, which may be performed as part of various embodiments of a routine for repositioning a failed video tool relative to a nearest edge.

FIG. 5 is a flow diagram illustrative of one possible routine 500 that is usable for finding edges (or edge pixels) in an image, which may be performed at block 402 in some embodiments of the routine 401 shown in FIG. 4A, and/or at block 412 in some embodiments of the routine 410 shown in FIG. 4B. At block 502 the image is smoothed, for example by using an averaging filter, to improve histogram modality for images that include highly-textured surfaces. At block 504 a grayscale histogram of the image is computed and smoothed. At decision block 506 it is decided whether the grayscale histogram has distinct modes (i.e., isolated groups of values that reflect pixel values that occur most often in the image). If so, at block 508 a threshold is found based on the histogram modes (automatic thresholding), and the threshold is applied to the image to produce a binary image that better defines the distinct regions (objects or features) corresponding to one or both of the isolated groups of values of the histogram. Otherwise, if at block 506 it is determined that the grayscale histogram does not have distinct modes, the operations at block 507 are performed to compute a gradient image, for example by using a Sobel operator, and a suitable threshold is applied to the gradient image to produce a binary edge image.

Regardless of whether the operable binary image is determined by the operations of block 507 or 508, at block 510 morphological closing operations (dilation followed by erosion) are run on the binary image to close holes in the distinct regions (objects or edge features).

At block 512 connected regions are defined in the morphologically filtered binary image resulting from the operations of block 510 and the connected regions are size-filtered so as to remove any irrelevant regions that are smaller than a certain size threshold. At block 514 pixels at the boundaries of the remaining connected regions are identified as edge pixels and the routine ends. When the Sobel operator is used as outlined above, it is technically the "centerlines" of the remaining connected regions that best correspond to edge pixels in the image. However, such connected regions will be very narrow, and identifying pixels at their boundaries as edge pixels will not significantly affect the results of subsequent operations that use the edge pixels for the purposes of this invention.

In accordance with various exemplary embodiments of the present invention, an automatic tool recovery method is practiced by an automatic tool recovery computer program including computer-executable instructions, which may be loaded to the control system portion 120 of a precision machine vision inspection system (see FIG. 2). In various embodiments, the automatic tool recovery computer program may be included in the video tool portion 143 of the memory 140 of the control system portion 120. The recovery program can either be associated with a video tool (merged to be an integral part of each video tool functionality) or it can be "separated" from the video tools and invoked when any of them fails. In either case, when such a program is associated with the operation of a video tool, the video tool becomes highly robust in that it becomes capable of automatically recovering itself upon encountering a failure.

In accordance with various exemplary embodiments of the present invention, a set of automatic tool recovery instructions is configurable by a user. FIG. 6 is a sample screenshot from a video display illustrating one example of a user interface that permits user configuration (or customization) of a set of automatic tool recovery instructions, as well as an automatic repositioning of a Circle tool relative to a circular feature in an image. In FIG. 6 a video display 601 includes an image window 603 that shows a circle feature 602 to be inspected, a message window 605, and a control panel 607. The control panel 607 includes an image characteristic value panel 610 that is displaying relevant image characteristic values that have been calculated based on the analysis of an image, such as image focus and brightness, which may be useful for the reference of skilled users. The control panel 607 further includes a recovery type selection panel 608, a tolerance specification panel 609, and a recovery trial command panel 611.

The recovery type selection panel 608 permits a user to select one or more types of adjustments to be performed by an automatic tool recovery computer program. In the illustrated example, four types of adjustments, "Light," "Focus," "Position (of the tool relative to an image feature)," and "THS (an edge strength threshold)," are selected. Thus, the resulting set of automatic tool recovery instructions will be configured to automatically perform each of these types of adjustments, for example as outlined previously for various routines that include such adjustments. The user can inactivate any of these adjustment types by altering the associated checkboxes, depending on each application. For example, the user can inactivate the "Position" and "THS" adjustments so that the automatic tool recovery computer program will perform only the "Light" and "Focus" adjustments (if needed).

The tolerance specification panel 609 permits a user to specify a general tolerance level for each of the adjustment types (e.g., "Light," "Focus," "Position," and "THS" in FIG. 6). Specifically, each of the various types of adjustments has a range of possible settings that can be used during the recovery process, and the tolerance level effectively specifies what percentage (part) of this range is used during the tool recovery. In the illustrated example, the tolerance specification panel 609 allows each tolerance to be set as "Low," "Medium," or "High." A "Low" tolerance means that a relatively small part of the total possible adjustment settings is allowed to be used to bring a given parameter (lighting, focus, tool position etc.) to the acceptable value, while a "High" tolerance means that a relatively large (or the entire) range of the possible adjustment setting is allowed to be used to bring a given parameter to the acceptable value. The name "tolerance", in this context, means the limits that are set for the various parameter search ranges that are used when attempting to successfully adjust the various feature inspection parameters during tool recovery operations. In general, an adjustment with a low tolerance tends to take a shorter period of time, because the parameter search range is smaller. However, low tolerance also implies higher likelihood of recovery failure, because it may be impossible to find suitable parameter adjustments within the limited parameter search range. Thus, when the user wishes to speed up the automatic tool recovery process and is willing to accept an increased likelihood of recovery failure, the user may select a "Low" tolerance level for this type of adjustment. On the other hand, if a higher probability of effective parameter adjustment is desired, and the user accepts that the adjusted parameter values may differ significantly from the parameter values that caused the tool failure, and that the recovery speed may be slower, the user may select a "High" tolerance level for this type of adjustment. It should be understood that the tolerance level may be set in various other ways, using various other formats or interface widgets, and is not limited to the particular embodiment illustrated in FIG. 6. For example, instead of three options ("Low," "Medium," and "High") to choose from, more or fewer options may be presented to the user. As another example, the tolerance specification panel 609 may prompt a user to enter a numeric value to specify an exact tolerance value.

The recovery trial command panel 611 may be used to run a preliminary test of a particular configuration of a set of automatic tool recovery instructions, so that a user can evaluate the efficacy of the configuration. For example, a user may intentionally define and position a tool, such as the circle tool 620 shown in FIG. 6, "out of position", and intentionally misadjust a light setting, etc., and then activate the "Recover Circle Tool" button in order to run the tool and the current configuration of the automatic tool recovery instructions. If the recovery is successful, the lights will be properly adjusted, and other feature inspection parameters will be properly adjusted, and the tool will run successfully, as indicated by the "TOOL OK! . . ." message in the message window 605. The repositioned circle tool 620' is displayed along with the original circle tool 620, so that the user can see the initial and adjusted positions of the tool on the display image, relative to the circle feature 602. As shown n FIG. 6, the recovered circle tool 620' is positioned such that its region-of-interest inner radius 623A' and outer radius 623B' encompass the edge of the circle feature 602 that is to be inspected.

In various exemplary embodiments of the present invention, the automatic tool recovery computer program is further configured to keep track of its operation, i.e., to gather information such as what types of tools have failed, for how many times, and further, for each tool failure, what types of adjustments were required to recover the tool. A suitable number of counters may be provided to carry out the tracking operation. The history of tool failure and recovery can be recorded and analyzed by a user, for example, to investigate the frequent causes of a tool failure.

While preferred and exemplary embodiments of the invention have been illustrated and described, it will be appreciated that various changes can be made therein according to the principles of this invention without departing from the spirit and scope of the invention.

The embodiments of the invention of which an exclusive property or privilege is claimed are defined as follows:

1. A method for automatically recovering a failed video tool in a precision machine vision inspection system, wherein the video tool fails based on an initial set of feature inspection parameters used for acquiring a workpiece feature image and operating the video tool to inspect the workpiece feature in the image,
the method comprising:
  (a) upon detecting the video tool failure, evaluating at least one feature inspection parameter based on an analysis of the workpiece feature image;
  (b) for the at least one feature inspection parameter evaluated based on the analysis of the workpiece feature image, determining whether the feature inspection parameter falls within a predefined acceptable range for that feature inspection parameter; and
  (c) if in step (b) it is determined that the feature inspection parameter falls outside the predefined acceptable range, automatically adjusting at least one member of the initial set of feature inspection parameters to provide a replacement set of feature inspection parameters that cause the video tool to operate successfully.

2. The method of claim 1, wherein the at least one feature inspection parameter evaluated based on the analysis of the workpiece feature image comprises at least one image characteristic.

3. The method of claim 2, wherein if at least one image characteristic falls outside of its predefined acceptable range, then automatically adjusting at least one member of the initial set of feature inspection parameters comprises adjusting at least one image acquisition parameter to bring each image characteristic within its predefined acceptable range.

4. The method of claim 3, wherein adjusting at least one image acquisition parameter to bring each image characteristic within its predefined acceptable range comprises adjusting at least one lighting parameter to bring a brightness characteristic within its predefined acceptable range.

5. The method of claim 3, wherein adjusting at least one image acquisition parameter to bring each image characteristic within its predefined acceptable range comprises adjusting at least one focus parameter to bring a focus characteristic within its predefined acceptable range.

6. The method of claim 3, wherein adjusting at least one image acquisition parameter to bring each image characteristic within its predefined acceptable range comprises:
  first adjusting at least one lighting parameter to bring a brightness characteristic within its predefined acceptable range; and
  following the first adjustment, secondly adjusting at least one focus parameter to bring a focus characteristic within its predefined acceptable range.

7. The method of claim 3, wherein, after adjusting at least one image acquisition parameter to bring each image characteristic within its predefined acceptable range, automatically adjusting at least one member of the initial set of feature inspection parameters further comprises:
(i) forming a test set of feature inspection parameters by replacing each counterpart in the initial set of feature inspection parameters with the at least one adjusted image acquisition parameter used to bring each image characteristic within its predefined acceptable range;
(ii) acquiring a workpiece feature image and operating the video tool to inspect the workpiece feature in the image based on the test set of feature inspection parameters; and
(iii) if the video tool operates successfully, using the test set of feature inspection parameters as the replacement set of feature inspection parameters that cause the video tool to operate successfully.

8. The method of claim 7, wherein if the video tool operates successfully during an execution of step (iii), then at least one step is executed from the group of steps comprising:
the step of automatically substituting the replacement set of feature inspection parameters for the initial set of feature inspection parameters during the operation of a part program,
the step of automatically substituting the replacement set of feature inspection parameters for the initial set of feature inspection parameters during a training mode of operation of the precision machine vision inspection system, and
the step of automatically using the inspection results determined during the successful operation of the video tool at step (iii) as inspection results for the current video tool operation in a part program, and automatically continuing with the next operation of the part program.

9. The method of claim 8, wherein, if the video tool is an edge tool and the video tool fails in step (iii), automatically adjusting at least one member of the initial set of feature inspection parameters further comprises:
(iv) determining whether the video tool did not encompass an edge in step (ii);
(v) if the video tool did not encompass an edge in step (ii), determining the location of the edge nearest to the video tool and adjusting tool location parameters included in the test set of feature inspection parameters, such that the video tool will encompasses the nearest edge; and
(vi) repeating steps (ii) and (iii).

10. The method of claim 9, wherein, if the video tool is an edge tool and the video tool fails in step (vi), automatically adjusting at least one member of the initial set of feature inspection parameters further comprises:
(vii) lowering an edge strength threshold parameter of the test set of feature inspection parameters; and
(viii) repeating steps (ii) and (iii).

11. The method of claim 1, wherein an allowed automatic adjustment range for at least one of the set of feature inspection parameters consisting of a lighting parameter, a focus parameter, tool location parameters, and an edge strength parameter, is determined by a user of the precision machine vision inspection system by operating a user interface of the precision machine vision inspection system.

12. A computer readable medium usable in a precision machine vision inspection system, the medium comprising computer instructions to execute a routine for automatically recovering a failed video tool in the precision machine vision inspection system, wherein the video tool fails based on an initial set of feature inspection parameters used for acquiring a workpiece feature image and operating the video tool to inspect the workpiece feature in the image,
the routine comprising:
(a) upon detecting the video tool failure, evaluating at least one feature inspection parameter based on an analysis of the workpiece feature image;
(b) for the at least one feature inspection parameter evaluated based on the analysis of the workpiece feature image, determining whether the feature inspection parameter falls within a predefined acceptable range for that feature inspection parameter; and
(c) if in step (b) it is determined that the feature inspection parameter falls outside the predefined acceptable range, automatically adjusting at least one member of the initial set of feature inspection parameters to provide a replacement set of feature inspection parameters that cause the video tool to operate successfully.

13. The computer readable medium of claim 12, wherein the at least one feature inspection parameter evaluated based on the analysis of the workpiece feature image comprises at least one image characteristic.

14. The computer readable medium of claim 13, wherein if at least one image characteristic falls outside of its predefined acceptable range, then automatically adjusting at least one member of the initial set of feature inspection parameters comprises adjusting at least one image acquisition parameter to bring each image characteristic within its predefined acceptable range.

15. The computer readable medium of claim 14, wherein adjusting at least one image acquisition parameter to bring each image characteristic within its predefined acceptable range comprises adjusting at least one lighting parameter to bring a brightness characteristic within its predefined acceptable range.

16. The computer readable medium of claim 14, wherein adjusting at least one image acquisition parameter to bring each image characteristic within its predefined acceptable range comprises adjusting at least one focus parameter to bring a focus characteristic within its predefined acceptable range.

17. The computer readable medium of claim 14, wherein, after adjusting at least one image acquisition parameter to bring each image characteristic within its predefined acceptable range, automatically adjusting at least one member of the initial set of feature inspection parameters further comprises:
(i) forming a test set of feature inspection parameters by replacing each counterpart in the initial set of feature inspection parameters with the at least one adjusted image acquisition parameter used to bring each image characteristic within its predefined acceptable range;
(ii) acquiring a workpiece feature image and operating the video tool to inspect the workpiece feature in the image based on the test set of feature inspection parameters; and
(iii) if the video tool operates successfully, using the test set of feature inspection parameters as the replacement set of feature inspection parameters that cause the video tool to operate successfully.

18. A precision machine vision inspection system comprising:
(a) a video tool, wherein the initial operation of the video tool when inspecting a workpiece is based on an initial set of feature inspection parameters used for acquiring a workpiece feature image and operating the video tool to inspect the workpiece feature in the image, and a video tool failure may occur during the initial operation;

(b) an automatic tool recovery routine comprising computer executable instructions for performing the steps of:
  (i) upon detecting the video tool failure, evaluating at least one feature inspection parameter based on an analysis of the workpiece feature image;
  (ii) for the at least one feature inspection parameter evaluated based on the analysis of the workpiece feature image, determining whether the feature inspection parameter falls within a predefined acceptable range for that feature inspection parameter; and
  (iii) if in step (ii) it is determined that the feature inspection parameter falls outside the predefined acceptable range, automatically adjusting at least one member of the initial set of feature inspection parameters to provide a replacement set of feature inspection parameters that cause the video tool to operate successfully; and
(c) a user interface for permitting a user to define the automatic tool recovery routine.

19. The precision machine vision inspection system of claim 18, wherein the user interface permits the user to determine an allowed automatic adjustment range for at least one of the set of feature inspection parameters.

20. The precision machine vision inspection system of claim 19, wherein the set of feature inspection parameters comprises a lighting parameter, a focus parameter, tool location parameters, and an edge strength parameter.

* * * * *

UNITED STATES PATENT AND TRADEMARK OFFICE
CERTIFICATE OF CORRECTION

PATENT NO. : 7,454,053 B2  Page 1 of 1
APPLICATION NO. : 10/978227
DATED : November 18, 2008
INVENTOR(S) : R. K. Bryll et al.

It is certified that error appears in the above-identified patent and that said Letters Patent is hereby corrected as shown below:

| COLUMN | LINE | ERROR |
|---|---|---|
| 23 (Claim 9, | 46 line 11) | "tool will encompasses" should read --tool will encompass-- |

Signed and Sealed this

Twenty-fourth Day of November, 2009

David J. Kappos
*Director of the United States Patent and Trademark Office*